Patented June 7, 1949

2,472,618

UNITED STATES PATENT OFFICE 2,472,618

PRODUCTION OF ETHYL ALCOHOL

Alexander S. Ramage, Detroit, Mich., assignor to Albert A. F. Maxwell, Detroit, Mich., as trustee No Drawing. Application February 5, 1944, Serial No. 521,282

3 Claims. (Cl. 260—639)

The present invention relates to the production of ethyl alcohol and the production of intermediate products from ethylene.

One of the objects of the present invention is to provide an improved process for the production of ethyl alcohol and intermediate products from ethylene, the process being characterized particularly by its economy of operation and the positiveness with which the reactions may be controlled.

Another object of the present invention is to provide an improved process for the production of ethyl alcohol and intermediate products from ethylene, in which chemical reactions are employed to effect the hydrolysis or other conversion of the ethylene. A further object of the invention is to provide an improved process for the production of ethyl alcohol and intermediate products from ethylene, which is positive in its action and which may be carried out in a plant which is relatively simple and inexpensive to construct and operate.

The known processes for the production of ethyl alcohol and intermediate products from ethylene are relatively expensive to practice on a commercial scale. For example, in the production of ethyl alcohol from ethylene, one process which is used commercially utilizes the absorption of the ethylene in strong sulphuric acid. This is followed by hydrolyzing the acid with water and subsequently distilling off the alcohol therefrom. Due to the cost of the acid and the difficulties in concentrating the dilute acid after distillation of the alcohol therefrom, the process is expensive and difficult to regulate. There is also a substantial loss of acid due to its reaction with unsaturated hydrocarbons other than ethylene which may be present as the starting material. All of these factors present serious commercial obstacles to the low cost production of ethyl alcohol from ethylene by this process.

The present process differs from known processes in that the ethylene is first reacted with a material, such for example as sulphur dioxide, as a gas or liquid, to form the product ethyl sulphite, $(C_2H_5)_2SO_3$. This material has been isolated and has been found to have a density of 1.1062 and a boiling point of approximately 320° F. The product is soluble and is partly decomposed in water.

The ethyl sulphite, $(C_2H_5)_2SO_3$, is then hydrolyzed and condensed and the ethyl alcohol is separated therefrom and recovered.

The process may be carried out in several ways, as shown by way of illustration in the following examples:

Example I

In a pressure autoclave, preferably glass lined, fitted with an agitating device, I place about 70 pounds of liquid sulphur dioxide $SO_2$, and into same inject through a fine nozzle a stream of a mixture of 56 pounds of ethylene $C_2H_4$ and 18 pounds of water vapor, said mixture being heated to 300° F. at a pressure of 500 pounds. The reaction is rapid and complete. A small amount of silver sulphate quickens the reaction. On completion of the reaction, 40 to 50 pounds of water are added, and again the pressure is raised by heat to 200 pounds. In a short time hydrolysis has taken place and the apparatus is then opened to a rectifier tower at such speed that only the sulphur dioxide passes off to be condensed by pressure for re-use and the alcohol is run off from the lower end of the tower. The reactions are as follows:

(1) Formation of ethyl sulphite, $(C_2H_5)_2SO_3$, from ethylene and sulphur dioxide:

$$2C_2H_4 + SO_2 + OH_2 = (C_2H_5)_2SO_3$$

(2) Hydrolyzation of ethyl sulphite into alcohol and sulphur dioxide:

$$(C_2H_5)_2SO_3 + 2H_2O = 2C_2H_5OH + H_2SO_3$$

$$64 + 18$$

Example II

Instead of the method described in connection with Example I, I may utilize a mixture of 60 pounds of ethylene, 70 pounds of sulphur dioxide, and 20 pounds of water vapor. This is passed through a heater and raised to 350° F. at a pressure of not less than 50 pounds per square inch. This material is then passed through suitable tubes, such for example as quartz tubes, to permit the irradiation of the vapors with energy rays chiefly in the ultraviolet spectrum. As a catalyst I use sodium or calcium bisulphite.

In carrying out the process I have successfully used a 6 inch arc lamp known as the "Uviarc" ultraviolet generator which is manufactured and supplied by the General Electric Vapor Lamp Company. The lamp is enclosed in a fused quartz tube and is electrically connected with a suitable source of electrical energy. Upon establishing the arc and operating such a generator at approximately 410 watts, it generates energy rays within the ultra-violet spectrum approximately as follows for each square centimeter and at a distance of 1 meter:

Near ultra-violet (approximately 4000 to 3100 Angstrom units), approximately 237 microwatts;

Middle ultra-violet (approximately 3100 to 2800 Angstrom units), approximately 95 microwatts;

Far ultra-violet (approximately 1850 to 2800 Angstrom units), approximately 193 microwatts.

It is to be understood that the output of such energy rays will vary with the size and power of the generator employed.

The complete spectral analysis of emitted rays per square centimeter and at a distance of 1 meter when the generator is operated at approximately 410 watts is approximately as follows:

| | Microwatts |
|---|---|
| Far infra-red | 47 |
| Near infra-red | 95 |
| Visible | 299 |
| Near ultra-violet | 237 |
| Middle ultra-violet | 95 |
| Far ultra-violet | 193 |

The condensate is treated as disclosed in connection with Example I for the separation and recovery of the alcohol and sulphur dioxide. In this reaction the bisulphite used as the catalyst will decompose, liberating sulphur dioxide, which is immediately combined with the materials passing through the tubes. The excess of sulphur dioxide then combines under the conditions of the reaction with the remaining materials in the catalyst and causes it to again form the bisulphite.

The ethylene which is used in this process may be derived from any suitable source and may be purified in any desired manner. One method of securing substantially pure ethylene which may be used in this process is disclosed in my co-pending application Ser. #475,468, filed February 11, 1943, and now abandoned.

I claim:

1. A process for the production of ethyl alcohol from ethylene comprising reacting ethylene, sulphur dioxide, and water in the proportions by weight of substantially 56 parts ethylene, 64 parts sulphur dioxide, and 18 parts water at a pressure of about 500 pounds per square inch and at a temperature of about 300° F., and then adding to the reaction mixture substantially 36 parts by weight of water and raising the pressure of the mixture to about 200 pounds per square inch, and then rectifying the final reaction mixture to recover ethyl alcohol.

2. A process for the production of ethyl alcohol from ethylene which comprises reacting under heat and pressure ethylene, sulphur dioxide, and water in a pressure chamber in substantially the following proportions by weight, 56 parts ethylene, 64 parts sulphur dioxide, and 18 parts water at a temperature of about 300° F. and at a pressure of about 500 pounds per square inch, and then adding to the reaction mixture in a closed pressure chamber about 36 parts by weight of water and heating the mixture to raise the temperature and pressure thereof to about 200 pounds per square inch, and thereafter rectifying the reaction mixture to recover ethyl alcohol.

3. A process for the production of ethyl alcohol from ethylene which comprises reacting in the presence of a small amount of silver sulfate and under heat and pressure ethylene, sulphur dioxide, and water in a pressure chamber in substantially the following proportions by weight, 56 parts ethylene, 64 parts sulphur dioxide, and 18 parts water, and then adding to the reaction mixture in a closed pressure chamber about 36 parts by weight of water and heating the mixture to raise the temperature and pressure thereof, and thereafter rectifying the reaction mixture to recover ethyl alcohol.

ALEXANDER S. RAMAGE.

REFERENCES CITED

The following references are of record in the file of this patent:

UNITED STATES PATENTS

| Number | Name | Date |
|---|---|---|
| 1,253,055 | Lacy | Jan. 8, 1918 |
| 1,591,151 | Wibaut | July 6, 1926 |
| 1,919,618 | Brooks | July 25, 1933 |

OTHER REFERENCES

Beilstein, "Handbuch der Organischen Chemie," vol. I, page 325 (1918); First Supplement to vol. I, page 164 (1928).

Ellis, "Chemistry of Petroleum Derivatives," vol. I, pages 574–5 (1934).